Feb. 25, 1958 F. H. RAYMOND 2,824,690

ALGEBRAIC POLYNOMINAL GENERATOR

Filed July 17, 1952 4 Sheets-Sheet 1

INVENTOR.
FRANCOIS HENRI RAYMOND

BY Theodore Hafner

ATTORNEY

INVENTOR.
FRANCOIS HENRI RAYMOND
BY Theodore Hafner
ATTORNEY

Feb. 25, 1958 F. H. RAYMOND 2,824,690

ALGEBRAIC POLYNOMINAL GENERATOR

Filed July 17, 1952 4 Sheets-Sheet 3

INVENTOR.
FRANCOIS HENRI RAYMOND

BY Theodore Hafner

ATTORNEY

INVENTOR.
FRANCOIS HENRI RAYMOND
BY Theodore Hafner
ATTORNEY

United States Patent Office 2,824,690

Patented Feb. 25, 1958

2,824,690

ALGEBRAIC POLYNOMIAL GENERATOR

François Henri Raymond, Saint-Germain-en-Laye, France, assignor to Societe d'Electronique et d'Automatisme, Courbevoie, France Application July 17, 1952, Serial No. 299,436

Claims priority, application France July 26, 1951

40 Claims. (Cl. 235—61)

Figure 1:
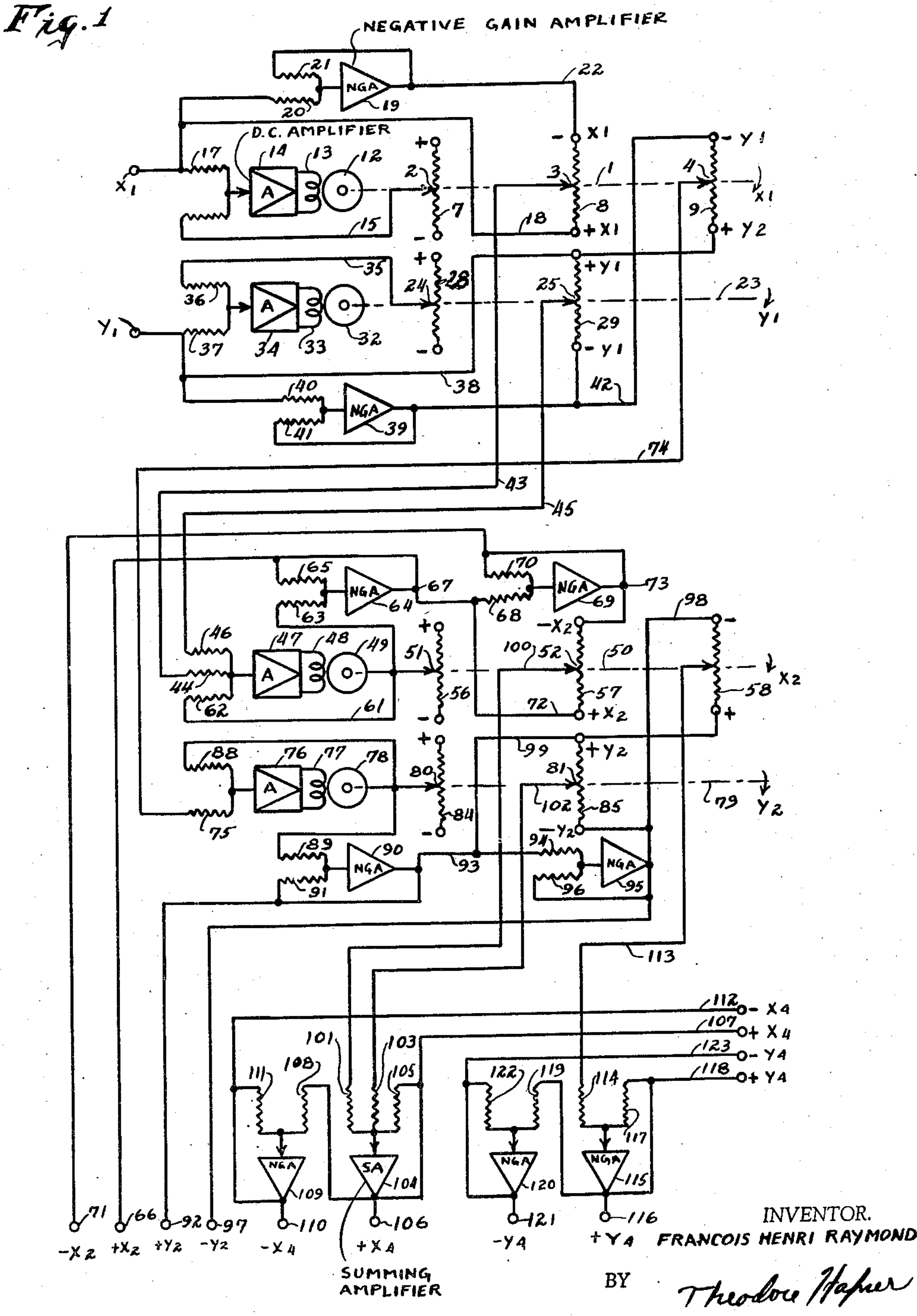

The present invention concerns improvements related to the realization of electric calculators designated to handle algebraic polynomials of $n$th degree of the general form:

$$Z=P(z)=a_0+a_1.z^1+a_2.z^2+a_3.z^3+a_4.z^4+a_5.z^5+a_6.z^6+a_7.z^7+ \dots \quad (1)$$

Variable $z$ is a complex variable such as:

$$z^1=x_1+jy_1 (j=\sqrt{-1}) \quad (2)$$

The invention proposes to establish electric calculators in such a way as to form in a permanent fashion, voltages representative of the real and imaginary portions, R(z) and J(z), respectively, of these polynomials; in the realization of such calculator e. g. for, but not limited to, the determination of the real and imaginary roots of the polynomial equal to zero, the values of the real portions $x_1$ and of the imaginary portions $y_1$ of the complex variable, represented by the electric control voltages of the calculator, are varied in the operator, manually or in accordance with a predetermined automatic or semiautomatic program.

By regrouping the terms of even and odd powers of $z$, expression (1) can also be written:

$$Z=a_0+a_2.z^2+a_4.z^4+a_6.z^6 \dots +z^1(a_1+a_3.z^2+a_5.z^4+a_7.z^6+\dots) \quad (3)$$

With substitution of $$z^2=x_2+jy_2, \quad z^4=x_4+jy_4, \quad z^6=x_6+jy_6 \dots \quad (4)$$

expression (3) becomes:

$$Z=a_0 + a_2.x_2 + a_4.x_4 + a_6.x_6 + \dots + j(a_2.y_2 + a_4.y_4 + a_6.y_6 + \dots) + x_1.(a_1 + a_3.x_2 + a_5.x_4 + a_7.x_6 + \dots) - y_1(a_3.y_2 + a_5.y_4 + a_7.y_6 + \dots) + jx_1(a_3.y_2 + a_5.y_4 + a_7.y_6 + \dots) + jy_1(a_1 + a_3.x_2 + a_5.x_4 + a_7.x_6 + \dots) \quad (5)$$

In designating:

$\Sigma1$, the algebraic sum $(a_0+a_2.x_2+a_4.x_4+a_6.x_6+ \dots)$
$\Sigma2$, the algebraic sum $(a_1+a_3.x_2+a_5.x_4+a_7.x_6+ \dots)$
$\Sigma3$, the algebraic sum $(a_2.y_2+a_4.y_4+a_6.y_6+ \dots)$
$\Sigma4$, the algebraic sum $(a_3.y_2+a_5.y_4+a_7.y_6+ \dots)$ the expressions for the real and imaginary portions of the polynomial P(z) become:

$$R(z)=\Sigma1+x_1.\Sigma2-y_1.\Sigma4 \quad (6)$$

$$J(z)=\Sigma3+x_1.\Sigma4+y_1.\Sigma2 \quad (7)$$

From relations (2) and (4), on the other hand, there are derived:

$$x_2=x_1^2-y_1^2 \text{ and } y_2=2x_1.y_1 \quad (8)$$

$$x_4=x_2^2-y_2^2 \text{ and } y_4=2x_2.y_2$$

and so on closer and closer, for the power values of $z$ contained in the binary series.

In addition there results from relations (4):

$$x_6=x_2.x_4-y_2.y_4 \text{ and } y_6=y_2.x_4+x_2.y_4 \quad (9)$$

because $z^6=z^2.z^4$, and generally, for $n$ even there is:

$$x_n=x_2.x_{n-2}-y_2.y_{n-2} \text{ and } y_n=x_{n-2}.y_2+x_2.y_{n-2} \quad (10)$$

These and other objects of the invention will be more fully described in the drawings annexed herewith for the case of an algebraic equation of the 7th degree. However, extension or restriction to any higher or lower degrees follows directly from the diagrams given.

The invention will be further explained, again for illustration only, as applied to a calculator for the determination of the real and imaginary roots of equation $P(z)=0$. Numerous other applications can be envisaged once the voltages representing R(z) and J(z), have been formed, respectively.

Figure 2:
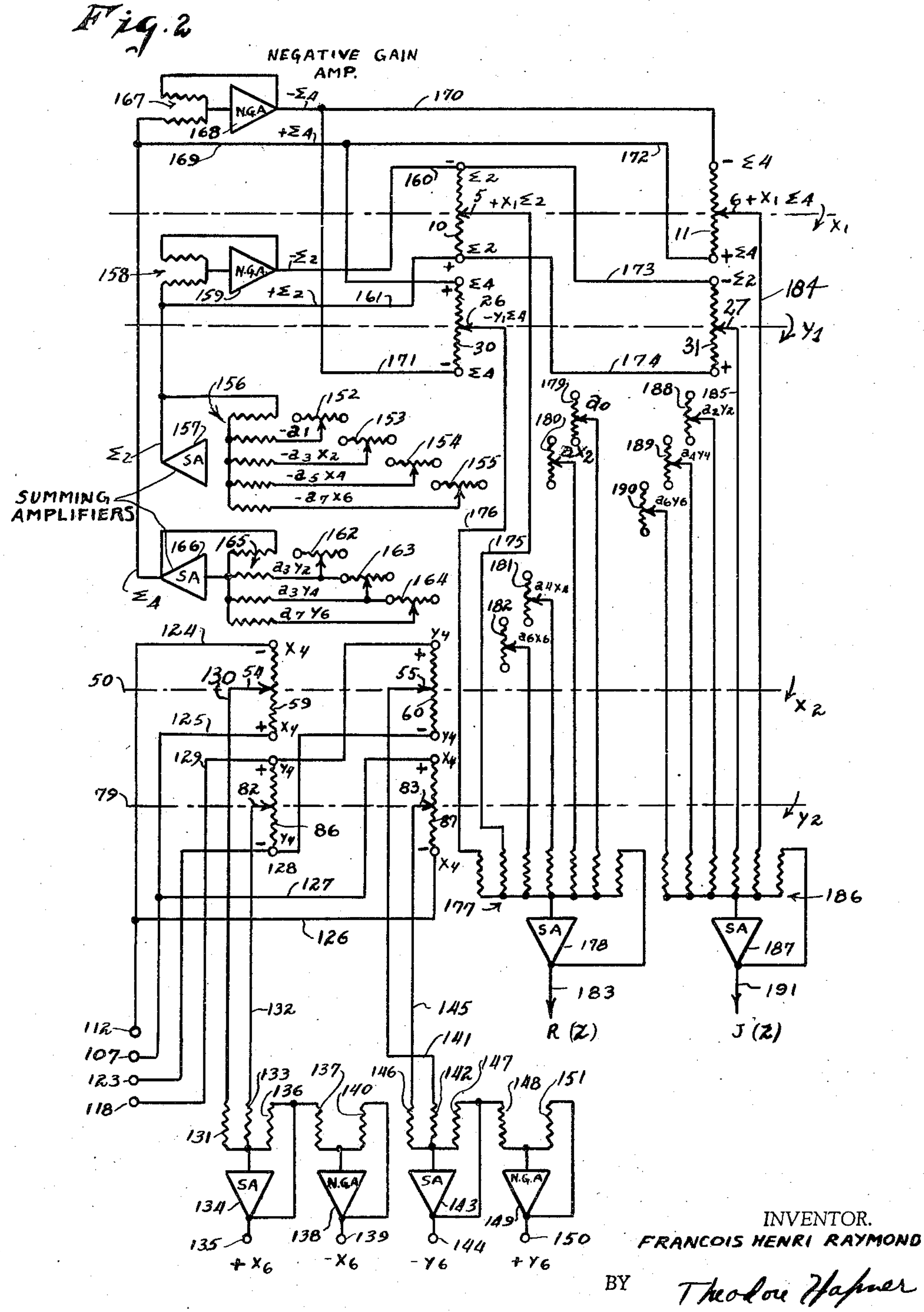

In the drawings,

Figs. 1 and 2, together, Fig. 1 being left of Fig. 2, show an example of a diagram of a calculator according to the invention.

Figure 3:
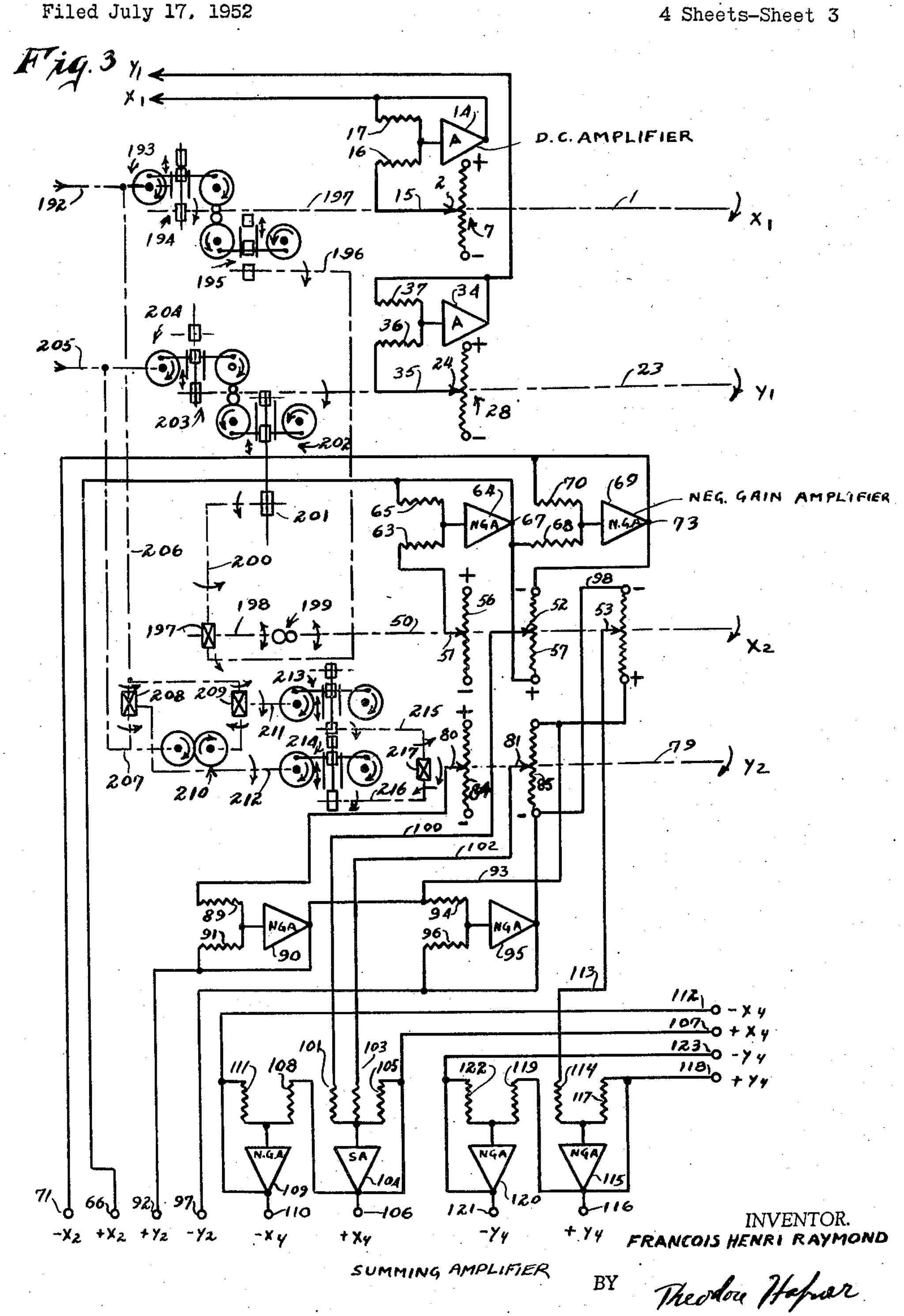

Fig. 3 which can be substituted for Fig. 1 in this assembly shows a variation of this embodiment.

Figure 4:
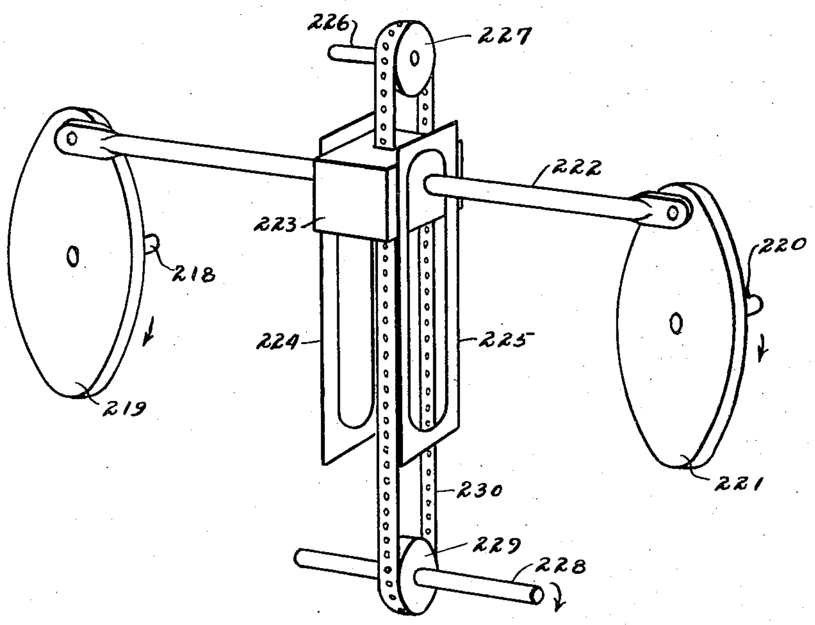
Figure 5:
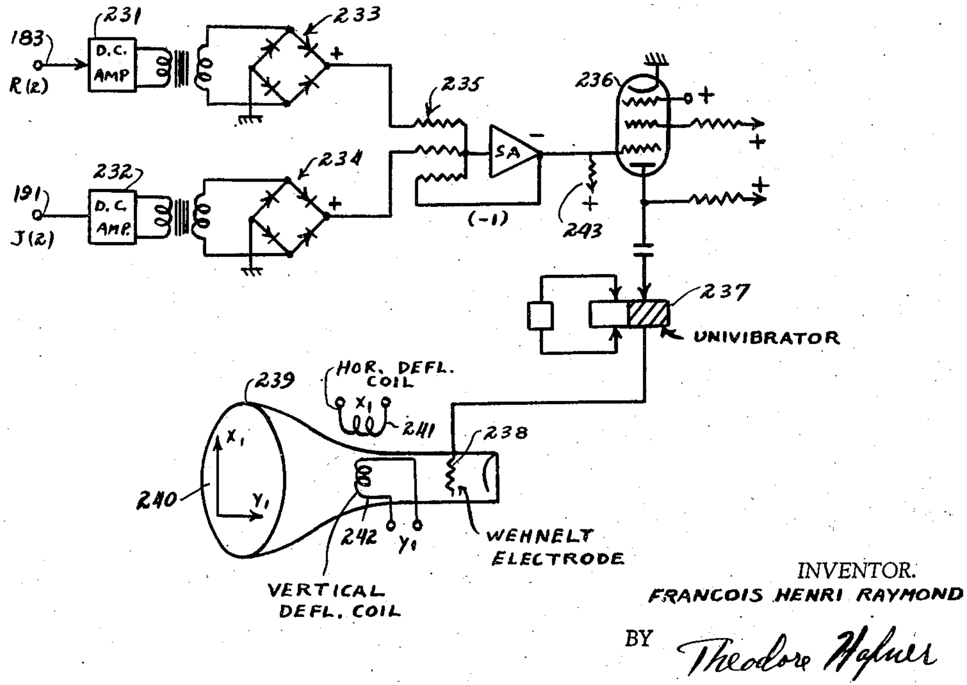

Fig. 4 presents an example of using an element in the diagram of the calculator of Fig. 3 and Fig. 5 represents a control diagram for the indicator to determine the real and imaginary roots of an algebraic equation derived from the voltages R(z) and J(z) produced for the calculator of Figs. 1–2 or 3–2.

Referring in the first place to Figs. 1 and 2, the two variables $x_1$ and $y_1$ are introduced in a calculator over shafts 1 and 23. These shafts can be operated or put into position manually and/or automatically by any desired means (not shown).

The control of these shafts will be described in greater detail further below, as applied in the calculator to the determination of the roots of an algebraic equation.

Shaft 1 if rotated drives potentiometers sliders 2 to 6. The potentiometers themselves are designated as 7 to 11 respectively. Potentiometer 7 receives at its terminals a fixed continuous potential difference or reference potential +V, −V. Shaft 1 is of one piece or rigidly coupled with the rotor of motor 12 with a separate excitation winding, for example, indicated at 13 and supplied from amplier 14. Input of amplier 14 is operated upon from a mixer with two resistances 16 and 17. Resistance 16 is connected over lead 15 to slider 2 of potentiometer 7. Resistance 17 is connected to a take-off terminal of voltage $x_1$. Such voltage if applied to terminal $x_1$ of the servomechanism to control the angular position of shaft 1.

The positioning servomechanism referred to is of the usual type but if necessary can be made inverse functioning if the given element is the position of slider 2 on potentiometer 7, which determines electric voltages $x_1$, while in a servomechanism in habitual application, there is the applied voltage $x_1$ that will determine the position of the slider in equilibrium.

It should be well understood that all the potentiometers drawn in linear shape are in fact of circular structure. The sliders are in the form of brushes driven by the mechanical axes shown.

Voltage $+x_1$ taken off by means of connection 18 is applied at one end of potentiometer 8. The other end of potentiometer 8 receives voltage $-x_1$; the latter is produced by polarity inversion in amplifier stage 19 of gain (−1). This stage consists as usual of an amplifier tube 19 of elevated gain operated by resistance mixer 20—21; resistance 20 receives electric voltage $+x_1$; the output voltage of stage 19 is taken over resistance 21; all resistances have the same value as the resistances of the other mixers shown in the diagrams.

Potentiometer 8 receives at its terminals voltage $\pm x_1$; its slider 3 indicates the value $x_1$. The voltage taken off potentiometer 8 has a value equal as usual to the product of the voltage at terminals with the indication coefficient (principle of the multiplying potentiometer).

At take off connection 43 of slider 3, therefore, there will appear a voltage proportional to $x_1^2$.

Shaft 23 if rotated, drives sliders or brushes 24 to 27 of potentiometers 28 to 31, respectively; potentiometer 28 receives at its terminals the same reference voltage $\pm V$ as potentiometer 7. Shaft 23 is driven by motor 32, separately excited at 33, of a servomechanism assembly: the voltage applied to slider 24 by conductor 35 is taken off resistance 36 of input mixer 36—37 of amplifier stage 34 feeding coil 33.

At the free end of resistance 37, there appears an electric voltage representing variable $y_1$, available at the terminal of the same reference. Through connection 38, this voltage $+y_1$ is applied on one end of potentiometer 29; at the other end of potentiometer 29, voltage $-y_1$ is applied. Voltage $-y_1$ is produced by the polarity inversion stage of unity gain of amplifier tube 39 and mixer 40—41. Resistance 40 receives voltage $+y_1$ and resistance 41 the output voltage of stage 39.

Here again the voltage taken off slider 25 and appearing on connection 45, represents the product of the voltage at terminals of potentiometer 29 indicating the position of slider 25, hence $-y_1^2$; note that the senses of connections for potentiometers 8 and 29 are reversed.

Conductor 43 is connected to resistance 44 and conductor 45 to resistance 46 of the input mixer of amplifier stage 47. The output of stage 47 supplies excitation coil 48 of motor 49 driving shaft 50. The voltage taken off slider 51 of potentiometer 56 is taken over connection 61 onto the third input resistance 62 of the mixer. Slider 51 is rigidly coupled with shaft 50 of motor 49 and potentiometer 56 receives at its terminals the reference voltage. This assembly constitutes therefore the position servomechanism and the voltage taken off the slider is the algebraic sum of the input voltages. Hence in this case the voltage is $-x_2=x_1^2-y_1^2$. This is the voltage applied over resistance 63 on the input of inversion stage 64 of gain (—1). The output voltage of stage 64 is taken over resistance 65 to the input mixer. At terminals 66 and 67, therefore, there appears an electric voltage representing variable $+x_2$. On the other hand, since the servomechanism is of the position type, variable $+x_2$ is equally available on shaft 50 in the form of an angle of rotation or more precisely of an angular position. The value of variable $x_2$ thus produced is thereafter indicated on potentiometers 57 to 60 by the positions of sliders 52 to 55.

Potentiometer 57 over connection 72 receives at one end the voltage $+x_2$; at its other end it receives voltage $-x_2$ produced by polarity inversion stage 69 of gain (—1). Stage 69 delivers this voltage to points 71 and 73; it has an input mixer 68—70; resistance 68 is connected to output 67 of stage 64; resistance 70 feeds the output voltage taken off at 73 back to the input. On conductor 100 of slider 52, therefore, there appears a voltage representing the value $x_2^2$.

Potentiometer 9 coupled to shaft 1 over slider 4, receives at its terminals over connections 42 and 38 the voltages $-y_1$ and $+y_1$. The voltage taken off slider 4 therefore is proportional to the product $x_1y_1$ ($x_1$ is the coefficient indicated by its slider).

This voltage is taken over connection 74 to the input of resistance 75 of the input mixer of a servomechanism to produce mechanically and electrically representations of quantity $y_2=2x_1y_1$. This servomechanism is a position mechanism of the usual type. It comprises amplifier 76 which feeds excitation 77 of motor 78 driving shaft 79; the angular position of the latter furnishes $y_2$ in mechanical form. Shaft 79 drives slider 80 of potentiometer 84. At the terminals of potentiometer 84 there is applied reference potential difference $\pm V$; the connection of slider 80 is led back to input resistance 88 of the input mixer of the amplifier. At slider 80, therefore, there is available the electric voltage representing $-y_2$. This voltage is first inversed by amplifier stage 90 of gain (—1). Stage 90 receives this voltage at input resistance 89. Its other input resistance 91 receives the voltage fed back from its output. Electric voltage $y_2$ therefore is available at 92 and 93. This voltage is again inversed in amplifier stage 95 of gain (—1). It is applied over input resistor 94 while input resistance 96 receives the voltage fed back from the output of amplifier 95. Voltage $-y_2$ is therefore available at 95 and 97.

Potentiometer 85 receives at its terminals potential difference $\pm y_2$; since the position of its slider indicates the value $y_2$, the voltage taken off conductor 102 of slider 81 will represent the square $y_2^2$. It will have sign (—) with respect to the voltage representing $+x_2^2$. The latter is taken off at 100 by inversion relative to the connection senses of potentiometers 57 and 85.

Conductors 100 and 102 are connected respectively to resistances 101 and 103 of input mixer of summing amplifier stage 104. The output voltage of stage 104 is fed back to the resistance 105 of that mixer in such a way that a voltage representing $+x_4$ is available at terminals 106 and 107.

This output voltage $+x_4$ is then polarity inversed in polarity in stage 109 of gain (—1). Stage 109 receives this voltage over input resistance 108. The other input resistance 111 is connected to output 110 upon which there appears—as well as on output 112—the electric voltage $-x_4$.

Potentiometer 58 over conductors 98 and 99 receives potential difference $\mp y_2$. Its slider 53 indicates coefficient $x_2$. The voltage taken off its slider over conductor 113, therefore, represents electric voltage $-y_4$. This voltage fed over input resistance 114 of stage 115 of gain (—1)—the other input resistance 117 receiving the returning output voltage—appears in inverse polarity at terminals 116 and 118. Moreover, this voltage $+y_4$ applied over input resistance 119 is again inversed in stage 120 of gain (—1). The other resistance 122 receives the voltage fed back from output 121. This establishes a voltage $-y_4$ available at terminals 121 and 123.

For the production of electric voltages representing values $x_6$ and $y_6$, circuits are now established in such a manner as to realize relation (9). In order to achieve this purpose, terminals 107, 112 of Fig. 1 brought to the votlages $+x_4-x_4$, respectively, are connected at 124, 125 to the terminals of potentiometer 59. Slider 54 indicates value $x_2$; thus the voltage taken off that slider over conductor 130 is proportional to product $x_2 \cdot x_4$.

Terminals 118—123 of Fig. 1 brought to voltages $+y_4$ and $-y_4$, respectively, are fed over conductors 128, 129 to the terminals of the potentiometer 86. The slider 82 of potentiometer 86 indicates value $y_2$. From that slider therefore over conductor 132 voltage $-y_2 \cdot y_4$ is derived. Sign (—) is to relate to the voltage taken off conductor 130 due to the relative inversion of the connection senses of the connection of these potentiometers.

The two voltages are added in summing amplifier 134, being applied on resistances 131 and 133 respectively of the input mixer. The third resistance 136 of that input mixer receives the returning output voltage at 135. This output voltage here is $+x_6$ taking into account the affect of the sign of the preceding outputs of Fig. 1.

Output voltage $+x_6$ is furthermore applied over input resistance 137 to inversion stage 138 of gain (—1). Output 139 of stage 138 is fed back over the other resistance 140 of the input mixer. At 139, therefore, voltage $-x_6$ is available.

Similarly, over conductors 128 and 129 potentiometer 60 receives at its ends the potential difference $\pm y_4$ while potentiometer 87 receives at its ends the potential difference $\pm x_4$. Slider 55 of potentiometer 60 indicates value $x_2$ and slider 83 of potentiometer 87 indicates value $y_2$; thus the output voltages taken off these sliders over wires 141 and 145, represent with the same sign the factors $x_2.y_4$ and $x_4.y_2$. Addition to these voltages, respectively, applied on resistances 142 and 146 of the input mixer of summing amplifier 143—the third resistance 147 of which receives the voltage fed back from output 144—delivers therefore voltage $-y_6$. This voltage is inversed in stage 149 of gain $(-1)$, being applied over resistance 148 on the input mixer of that stage. The other resistance 151 is connected to output 150. At output 150 of that ampifier stage, therefore, there appears voltage $+y_6$.

The chosen example stops at values $\pm x_6$, and $\pm y_6$. It is apparent, however, that from these two voltage values voltages $\pm x_8$ and $\pm y_8$ can be produced. Thereafter, from these latter values, the two voltage values $\pm x_{10}$ and $\pm y_{10}$ can be derived and so forth in cascade development.

It will suffice for that purpose to couple shafts 50 and 79 of as many assemblies of four potentiometers similar to potentiometers 59, 60 and 86—87, and to connect their terminals to summing outputs delivering voltages of even index immediately inferior, and to connect sliders to summing inputs similar to stages 134 to 149.

It is noted that the preceding production of voltage values $\pm x_4$ and $\pm y_4$ reverts to the latter method because in the particularization of relation (9) in order to pass from $\pm x_2$, $\pm y_2$ to $\pm x_4$, $\pm y_4$ $n$ had to be 4.

The elected voltages representing algebraic sums $\Sigma 2$ and $\Sigma 4$ defined above are formed, Fig. 2, by means of amplifier summing stages 157 and 166, respectively. The component voltages are applied individually over the input resistances of mixers 156 and 165 of stages 157 and 166.

The input mixer of stage 157 receives the following voltages:

From the slider of potentiometer 152 where there is applied reference voltage $\pm$V, stage 157 receives a voltage proportional to $a_1$.

From the slider of potentiometer 153 where there is applied the voltage $\pm x_8$, stage 157 receives a voltage proportional to product $a_3.x_2$; the value of coefficient $a_3$ of the algebraic equation is indicated by the position of that slider.

From the slider of potentiometer 154 where there is applied the voltage $\pm x_4$, stage 157 receives a voltage proportional to product $a_5.x_4$; the value of coefficient $a_5$ of the algebraic equation is indicated by the position of that slider.

From the slider of potentiometer 155 where there is applied the voltage $\pm x_6$, stage 157 receives a voltage proportional to the product $a_7.x_6$; the value of coefficient $a_7$ of the algebraic equation is indicated by the position of that slider.

The input mixer 165 of the summing stage 166 receives the following voltages:

From the slider of potentiometer 162 where there is applied voltage $\pm y_2$, stage 166 receives a voltage proportional to product $a_3.y_2$; the value of coefficient $a_3$ of the algebraic equation is indicated by the position of that slider.

From the slider of potentiometer 163 where there is applied the voltage $\pm y_4$, the stage 166 receives a voltage proportional to the product $a_5.y_4$ value of coefficient $a_5$ of the algebraic equation as indicated by the position of that slider.

From the slider of potentiometer 164, where there is applied the voltage $\pm y_6$; stage 166 receives a voltage proportional to product $a_7.y_6$; the coefficient $a_7$ of the algebraic equation has its value indicated by that slider.

Electric voltage $\Sigma 2$ must be multiplied by the value of variable $x_1$ and by that of variable $y_1$. In order to achieve this purpose, in the first place, the voltage available at the output of summing stage 157 is applied over conductors 161 and 174 on a terminal marked (+) of potentiometers 10 and 31. Slider 5 of potentiometer 10 is coupled to shaft 1 which is the shaft of the $x_1$, and slider 27 of potentiometer 31 is coupled to shaft 23 which is the shaft of the $y_1$. On the other hand, this voltage is inversed in amplifier stage 159 of gain $(-1)$ with input mixer 158. The voltage of inverse polarity is applied over conductors 160 and 173 on the terminals marked $(-)$ of the same potentiometers 10 and 31.

Electric voltage $\Sigma 4$ must be multiplied by the value of variable $x_1$ and by that of variable $-y_1$. In order to achieve this purpose, in the first place, the voltage available at the output of summing stage 166 is applied over conductors 169 and 172 on terminals marked (+) of potentiometers 30 and 11. Potentiometer 30 has its slider 26 coupled to shaft 23 which is the shaft of the $-y_1$. On the other hand, this output voltage of stage 166 is inversed in amplifier stage 168 of gain $(-)$ with input mixer 167. The voltage of inverse polarity is applied over conductors 171 and 170 on the terminals marked $(-)$ of the same potentiometers.

In this way the following voltages are available:

Voltage $x_1.\Sigma 2$ on conductor 175 of slider 5
Voltage $y_1.\Sigma 4$ on conductor 176 of slider 26
Voltage $x_1.\Sigma 4$ on conductor 184 of slider 6
Voltage $y_1.\Sigma 2$ on conductor 185 of slider 27

Conductors 175 and 176 are connected to the two input resistances of mixer 177 of summing amplifier 178. The other input resistances receive the component voltages of the algebraic sum defined above $\Sigma 1$, i. e.:

From the slider of potentiometer 179 receiving reference voltage $\pm$V, stage 178 receives a voltage proportional to coefficient $a_0$ of the algebraic equation the value of which is indicated by said slider;

From the slider of potentiometer 180, receiving the voltage $\pm x_2$, stage 178 receives a voltage proportional to product $a_2.x_2$; the value of coefficient $a_2$ of the algebraic equation is indicated by the position of said slider;

From the slider of potentiometer 181 receiving voltage $\pm x_4$, stage 178 receives a voltage proportional to product $a_4.x_4$; the value of coefficient $a_4$ of the algebraic equation is indicated by the position of that slider;

From the slider of potentiometer 182 receiving the voltage $\pm x_6$, stage 178 receives a tension proportional to product $a_6.x_6$; the value of the coefficient $a_6$ of the algebraic equation is indicated by the position of that slider.

Mixture and addition of these different voltages assure, therefore, the production at output 183 of summing amplifier 178 of an electric voltage representing the real portion $R(z)$ of the algebraic equation in conformance with relation (6).

Conductors 184 and 185 are connected to the two input resistances of mixer 186 of a summing amplifier 187. The other resistances of stage 187 receive the component voltages of the algebraic sum above defined $\Sigma 3$, i. e.:

From the slider of potentiometer 188 receiving the voltage $\pm y_2$, stage 187 receives a voltage proportional to product $a_2.y_2$; the value $a_2$ of the coefficient of the algebraic equation is indicated by the position of that slider;

From the slider of potentiometer 189 receiving the voltage $\pm y_4$, stage 187 receives a voltage proportional to product $a_4.y_4$; the value of coefficient $a_4$ of the algebraic equation is indicated by the position of that slider;

From the slider of potentiometer 190 receiving the voltage $\pm y_6$, stage 187 receives a voltage proportional to product $a_6.y_6$; the value of coefficient $a_6$ of the algebraic equation is indicated by the position of that slider.

Mixture and addition of these different voltages, therefore, assure the production at output 191 of summing amplifier 187 of an electric voltage representing the imaginary portion $J(z)$ of the algebraic equation in conformance with relation (7).

Fig. 3 shows a variation of the realization of Fig. 1 utilizing mechanical calculator for the production of variable quantities $x_1$—$y_1$ and $x_2$—$y_2$. This implies the following equations:

$$x_1=\sin a \text{ and } y_1=\sin b \quad (11)$$

$$x_2=x_1^2-y_1^2=\tfrac{1}{2}(1-\cos 2a)-\tfrac{1}{2}(1-\cos 2b) \quad (12)$$

$$y_2=2x_1.y_1=\cos (a+b)-\cos (a-b)$$

Shaft 192 for indicating the values of a controls mechanism 193—194 as illustrated in greater detail in Fig. 4 which assures driving of shaft 197 in accordance with the rotative displacement proportional to sin $a=x_1$. Shaft 197 is of one piece rigidly coupled with shaft 1 mentioned above.

By means of a reduction gear mechanism, mechanism 193 drives mechanism 195 which causes shaft 196 to turn proportionally to quantity 1—cos $2a$, i. e. $2x_1^2$.

Shaft 205 for indicating $b$ controls mechanism 203—204 which assures driving of shaft 23 mentioned above in accordance with a rotative displacement proportional to sin $b=y_1$.

By means of a reduction gear transmission, 203—204 drives mechanism 202 which drives shaft 200 with inversion of direction at 201 to cause it to turn proportionally to quantity 1—cos $2b$, i. e. $2y_1^2$.

Differential 197 controlled by the two shafts 196 and 200, drive shaft 198 which turns therefore with a rotation proportional to $2x_1^2-2y_1^2$. If divided by 2 through transmission 199, this rotation represents the value of variable $x_2$ and is therefore applied to drive shaft 50 above mentioned.

On the other side, shaft 206 of one piece with or rigidly coupled to shaft 192, and shaft 207 solidly coupled with shaft 205 operate upon differentials 208 and 209; shaft 207 operates the latter differential 209 after inversion of direction of rotation at 210. Shaft 212 therefore turns proportional to $(a+b)$ and shaft 211 proportional to $(a-b)$. These two shafts drive mechanisms 214 and 213 respectively which resemble preceding mechanism 193, 204, . . . . As a result shafts 216 and 215 are driven at rotations which are proportional to quantities cos $(a-b)$ and cos $(a+b)$. With differential 217 operated upon by shafts 216 and 215, therefore, shaft 79 mentioned above is driven in conformance with variable $y_2$.

An example illustrating the mechanism for transforming a rotation proportional to a quantity into a rotation proportional to a trigonometric line, sine or cosine of that quantity, or of a multiple of that quantity, is indicated in Fig 4. Two discs 219 and 221 are supported on shafts 218 and 220, respectively, shaft 218 being assumed to be driving. Discs 219 and 221 have the same radius and are connected by crossbar 222 mounted eccentrically on each of the discs 219 and 221. Bar 222 supports a block 223 sliding between the guide rails 224 and 225. Block 223 is solidly attached to belt 200 passing over rollers 227 and 229 supported on shafts 226 and 228, respectively. Shaft 228 is assumed to be the driven shaft. Block 223, of course, is free to slide over bar 222. Since shaft 218 is driven, bar 222 remains horizontal but its height will vary, for example, conforming to the variation of the trigonometric line, sine or cosine, selected in accordance with the initial fixation of the eccentric supporting bar 222. By driving roller 229 through belt 230, this amplitude variation is translated into a variation of angular position.

The calculator just described in one or the other of its embodiments, therefore, permits to produce at any instance the values of the real and imaginary portions of an algebraic equation of the type defined for the values controlled by variables $x_1$ and $y_1$. The latter define together the value of variable $z$ of that equation.

The change in values of variables $x_1$ and $y_1$ can be achieved independently from each other or in accordance with any law of coordination preestablished or imposed by the operator. The latter is entirely master in indicating the multiplicity of values of the equation coefficients on the indication potentiometers of the machine.

Considering for example that it is desired to resolve the algebraic equation i. e. to determine its real and imaginary roots which means requiring the following determinations:

$$|Z|=|R|+|J|=0\approx\epsilon \quad (13)$$

$\epsilon$ is very small and arbitrarily determined; this determination may easily be conducted by taking output terminals 183 and 191 of Fig. 2; they deliver electric voltages proportional in quantity and sense to the real and imaginary portions R($z$) and J($z$) of the equation and are connected to the inputs of the same references of the circuit diagrammatically represented in Fig. 5.

This circuit comprises, in the first place, conventional amplifiers 231 and 232 the output voltages of which are rectified, for example, by dry rectifier bridges 233 and 234. The positive output voltages of these bridges are applied on two input-resistances of summing amplifier 235 of gain (—1). Thereby, appearance at its output of a negative voltage is caused, indicating the modul of Z if $x_1$ and $y_1$ are caused to vary in accordance with any predetermined law.

This negative voltage is applied as blocking voltage on the suppressor grid of a three-grid tube 236. Tube 236 has at its suppressor grid permanently a positive voltage. At 243 there is indicated a voltage of positive polarization of slight value. This slight voltage will tend to hold tube 236 permanently conducting, were it not for the negative voltage received from stage 235. It is clear that each time the output voltage of that stage will become sufficiently small so that the suppressor grid potential attains ground potential 236 will be deblocked. The value of polarization 243 defines the amount of approximation of the roots.

Tube 236 on becoming conducting, delivers a negative voltage which actuates a monostable flip flop stage 237 by blocking the tube deblocked in the rest position of that stage. Otherwise, this stage is of usual construction and of a restoration time determined arbitrarily for a desired duration of output voltage pulse. The output of flip flop stage 237, therefore, in positive, as soon as actuated operates upon the control grid or Wehnelt electrode of a cathode ray tube indicator. The vertical and horizontal deflection coils 241 and 242 of the tube receive voltages representing variables $x_1$ and $y_1$. As a result as soon as the quantity of one or the other of these two variables is varied, the position of the cathodic spot on screen 240 of tube 239 will vary accordingly. Shafts $x_1$ and $y_1$ are indicated upon screen 240. However, the illumination of the spot will only occur if Wehnelt electrode 238 receives a positive voltage from monostable flip flop stage 237, i. e. as soon as the modul of Z passes through zero, within the desired approximation.

It is advantageous to provide means (not shown) in front of screen 240 to assure registration on a photographic plate, in the course of a determination procedure. The latter can then be conducted in the following manner:

After having indicated the coefficients of the equation to be solved, the operator manoeuvers the control shaft of the $x_1$ leaving at rest the control shaft of the $y_1$ (or conversely). If in this operation the value of modul Z passes through zero, the cathodic spot illuminates the screen on that of shafts $x_1$ and $y_1$ which is explored, and registration of that root value takes place.

The operator then shifts one of values $x_1$ and $y_1$ in order to displace the line of exploration along which he varies thereafter the other of the variables in a continuous fashion. In this way, he will or will not obtain one or several roots. He then takes back to zero the variable of exploration, reshifts the value which controls determination of the line about to be explored, and so forth, until the complex plane defined on screen 240 of oscillograph 239 is completely explored.

It is well understood that this exploration can be rendered automatic or semi-automatic, by providing an automatic or semi-automatic drive for shafts 1 and 23, Fig. 1, and shafts 192 and 205, Fig. 3.

Still further variations can be applied to the dispositions described without exceeding the scope of the invention such as defined by the preceding description.

The resulting calculators which deliver voltages representing real and imaginary portions of an algebraic equation are not limited to be used for the simple solution of equations such as have been just described in the procedure for root determination. Such calculators can also be incorporated in all types of chains for calculation or transmission of controlled quantities, all this without departing from the spirit of the invention.

I claim:

1. In a system for computing the real and imaginary portions of a polynomial P(z) of nth degree, two pairs of adjustment means, the first pair of adjustments means being adjustable to positions corresponding to a pair of substitute variables representing the real and imaginary portions of z respectively, sources of reference potentials controlled by said first pair of adjustment means to reproduce potentials representing respectively said pair of substitute variables, means including sources of potentials representing said substitute variables and controlled by said first pair of adjustments means to produce a first pair of derivative variables and control said second pair of adjustment means, a number of groups of further sources of potentials corresponding to a number of other pairs of derivative variables, each particular pair of said other derivative variables being derived from derivative variables preceding said particular pair of derivative variables; each group of said further sources including two sources of potentials representing a preceding pair of derivative variables and controlled by said second pair of adjustment means to produce potentials representing a succeeding pair of derivative variables; a first pair of groups of potential multiplying means including a number of sources of potentials representing all said pairs of derivative variables and adjustment means adjusted to produce two series of product potentials of said derivative variables and the even coefficients of P(z), and a second pair of groups of potential multiplying means including a number of sources of potentials representing all said pairs of derivative variables and adjusted to produce two further series of product potentials of said derivative variables and the odd coefficients of P(z), means for adding said further two series of product potentials respectively, to produce two output potentials representing the sums of said of each of said further two series of product potentials said output potentials derived from said odd coefficients being controlled by said first pair of adjustment means to produce four product potentials of sums of said second further pair of series of products multiplied by pairs of substitute variables; and two final means each for adding two of the last-mentioned product potentials derived from said last pairs of sources and one of the two series of product potentials derived from said even coefficients, to produce two output potentials representing respectively the real and imaginary portions of P(z).

2. System according to claim 1 wherein at least some of said sources of potentials are in the form of multiplying potentiometers having sliders and at least some of said adjustment means include shafts coupled to said sliders.

3. System according to claim 1 wherein at least some of said adding means are in the form of amplifiers having several input circuits for summing potentials applied thereon.

4. System according to claim 1 wherein at least some of said adjustment means include shafts and potential responsive servo-mechanisms controlling the angular movement of said shafts.

5. System according to claim 1 comprising polarity inversion means coupled to at least some of said sources of potentials.

6. System according to claim 1 comprising polarity inversion means coupled to at least some of said adding means.

7. System according to claim 1 comprising polarity inversion means coupled to at least some of said sources of potentials, and polarity inversion means coupled to at least some of said adding means.

8. System according to claim 1 wherein said substitute variables are inserted in the form of $z=x_1+jy_1$.

9. System according to claim 1 wherein said derivative variables are inserted in a sequence of alternating numerical order.

10. System according to claim 1 wherein said derivative variables are inserted in a sequence of even numerical order.

11. System according to claim 1 wherein said substitute variables are inserted in the form of $z=x_1+jy_1$, and wherein said derivative variables are inserted in a sequence of even numerical order.

12. System according to claim 1 wherein said algebraic polynominal is of nth degree with real numerical coefficients and the complex variable is substituted by $z_1=x_1+jy_1$ and is written directly:

$$Z=P(z)=a_0.z^2+a_4.z_4+ \dots +z^1$$
$$(a_1+a_3.z^2+a_5.z^4+a_7.z^6+ \dots )$$

and by substitution $$z^2=x_2+jy_2,\ z^4=x_4+jy_4;\ z^6=x_6+jy_6 \dots$$

transferred into:

$$Z=P(z)=\Sigma 1+x_1.\Sigma 2-y_1.\Sigma 4+j(\Sigma 3+x_1.\Sigma 4+y_1.\Sigma 2)$$

there being defined:

Σ1, the algebraic sum $(a_0+a_2.x_2+a_4.x_4+a_6.x_6+ \dots )$
Σ2, the algebraic sum $(a_1+a_3.x_2+a_5.x_4=a_6.x_6+ \dots )$
Σ3, the alegbraic sum $(a_2.y_2+a_4.y_4+a_6.y_6+ \dots )$
Σ4, the alegbraic sum $(a_3.y_2+a_5.y_4+a_7.y_6+ \dots )$ and first derivative variables $x_2$ and $y_2$ being related to substitute variables $x_1$ and $y_1$ by relations:

$$x_2=x_1^2-y_1^2 \text{ and } y_2=2x_1.y_1$$

and other derivative variables of higher orders being related to said first derivative variables $x_2$ and $y_2$ and preceding derivative variables $x_{n-2}$ and $y_{n-2}$ by relations ($n$ being even):

$$x_n=x_2.x_{n-2}-y_2y_{n-2} \text{ and } y_n=x_{n-2}.y_2+x_2y_{n-2}$$

13. System according to claim 1 comprising two shaft pairs, multiplying potentiometers having sliders coupled to the first shaft pair and receiving respectively potentials corresponding to said substitute variables, and another multiplying potentiometer coupled to the shaft of said shaft pair corresponding to one substitute variable and receiving a potential corresponding to another substitute variable, means for mixing the output potentials of the sliders of said multiplying potentiometers, and means under control of the mixture for controlling the shafts of the second pair.

14. System according to claim 13 wherein the mixture takes place in accordance with a predetermined linear relation between substitute and derivative variables.

15. System according to claim 1 comprising means under control of said substitute variable to produce potentials corresponding to a sequence of derivative variables, said derivative variables multiplied with predetermined sequences of numerical coefficients of P(z) forming algebraic sums, and thereby permanently representing said real and imaginary portions of P(z).

16. System according to claim 1 comprising a pair of primary control means, means under control of said primary means for producing adjustments of said first pair of adjustment means proportional to a trigonometrical function of two quantities represented by the positions of said primary control means; and means for controlling the second pair of adjustment means under control of said primary control means and under control of the first pair of adjustment means in accordance with the following trigonometrical formulae:

$$x_2=\sin^2 a-\sin^2 b \text{ and } y_2=\cos (a+b)-\cos (a-b)$$

$a$ and $b$ being the value of the two primary control positions.

17. System according to claim 1 comprising two shaft pairs and a pair of primary shafts, means under control of said primary shafts for producing rotations of the first shaft pair proportional to a trignonometrical function of two quantities represented by the rotations of said primary shafts and means for controlling the shafts of the second pair under control of said primary shafts and under control of the shafts of the first pair in accordance with the following trigonometrical formulae:

$$x_2=\sin^2 a-\sin^2 b \text{ and } y_2=\cos (a+b)-\cos (a-b)$$

$a$ and $b$ being the rotation values of the two primary shafts.

18. System according to claim 1 comprising two shaft pairs corresponding to substitute and first derivative variables respectively and a pair of potentiometers coupled to each of said shafts receiving reference potentials and potentials representing shaft variables respectively, and a third potentiometer coupled to one shaft of each pair receiving a potential difference representing the variable corresponding to another shaft, a number of transfer stages for receiving the output potential from the sliders of said potentiometers so that one of said transfer stages will deliver an output potential proportional to the difference of potentials delivered by the sliders of the potentiometers which receive the potential at terminals of the same denomination as their shaft; while the other of said transfer stages will deliver an output potential proportional to the difference of potentials delivered by the sliders of the potentiometers which receive the potentials at terminals of the same denomination as their shafts; while the other of said transfer stages will deliver an output potential proportional to the potential delivered by the slider of the potentiometer which receives at its terminals the potential representing the variable corresponding to the shaft other than that coupled to its slider.

19. System according to claim 1 comprising a cathode ray tube having illuminating means and deflection assemblies receiving potentials representing substitute variables $x_1$, $xy_1$, means for rectifying and adding the output potentials representing said real and imaginary portions, and means under control of the added potentials for controlling the illumination of said tubes so as to determine the roots of P($z$).

20. System according to claim 1 comprising means for controlling the illumination under control of a potential of less than a predetermined value.

21. In a system for computing the real and imaginary portions of a polynomial P($z$) of $n$th degree, two pairs of shafts and means for driving the first shaft pair to angular positions corresponding to the values of substitute variables $x_1$ and $y_1$ representing the real and imaginary portions of $z$, means under control of the first shaft pair for driving the second shaft pair to angular positions corresponding to the value of derivative variables $x_2$ and $y_2$ derived from said substitute variables including potentiometers receiving a reference potential difference and potential differences representing variables $x_1$ and $y_1$ respectively, having sliders coupled to said first shaft pair to deliver potential differences controlling the values of angular positions $x_2$, $y_2$ respectively; a number of summing amplifiers, a number of assemblies of potentiometers having sliders coupled to said second shaft pair including an assembly of potentiometers receiving a reference potential difference and potential differences representing derivative variables $x_2$ and $y_2$ respectively, and assemblies of four potentiometers corresponding to the number of pairs of values of other derivative variables $x_n$, $y_n$ derived from preceding substitute variables, said four potentiometers having two sliders coupled to the shaft corresponding to $y_2$; the two potentiometers of each shaft receiving potential differences representative of derivative variables $x_{n-2}$ and $y_{n-2}$, and the two sliders of each shaft being coupled to different inputs of said amplifiers the outputs of which form potential differences representing derivative variables $x_n$ and $y_n$; four multiplying potentiometer assemblies having sliders indicating in pairs the values of the coefficients of P($z$) and having resistances receiving in pairs the potentials representing all said pairs of derivative variables to be multiplied by said numerical coefficients; whereby the multiplying potentiometers indicating coefficients $a_0$ and $a_1$ have resistances receiving a reference potential difference; one pair of further summing amplifiers having inputs receiving respectively the slider potentials of those multiplying potentiometers indicating the odd numbered coefficients of P($z$) and having outputs forming of two algebraic sums Σ2 and Σ4; four further potentiometers having resistances receiving in pairs the outputs of said two further summing amplifiers and having sliders coupled in pairs to the first pair of shafts to deliver at the sliders of said four further potentiometers the four potentials $x_1\Sigma 2$, $-y_1\Sigma 4$, $x_1\Sigma 4$ and $y_1\Sigma 2$; and two final summing amplifiers having inputs receiving respectively the potential differences of those multiplying potentiometer sliders indicating the even numbered numerical coefficients of P($z$) and delivering potential differences forming together the algebraic sums Σ1 and Σ3, plus the potential differences of those further potentiometer sliders coupled to the shafts indicating values $x_1$ and having resistances $y_1$ and receiving the potential differences representing sums Σ2 and Σ4; and polarity inversion stages coupled in front of the resistances at least some of said potentiometer sliders coupled to said final summing amplifier inputs so as to produce two final summing amplifier outputs delivering respectively potential differences representing the values of the real portion $$R(z)=\Sigma 1+x_1\Sigma 2-y_1\Sigma 4$$

and imaginary portion $J(z)=\Sigma 3+x_1\Sigma 4+y_1\Sigma 2$ of P($z$).

22. System according to claim 21 wherein the first alternating coefficients to be entered are the odd coefficients of P($z$) and the second alternating coefficients to be entered are the even coefficients of P($z$) except coefficients $a_0$ and $a_1$.

23. System according to claim 21 wherein said polynomial is an algebraic polynomial with real numerical coefficients of a complex variable: $z_1=x_1+jy_1$ written directly:

$$Z=P(z)=a_0.z^2+a_4.z_4+\ldots+z^1$$
$$(a_1+a_3.z^2+a_5.z^4+a_7.z^6+\ldots)$$

or by substitution $$z^2=x_2+jy_2,\ z^4\pm x_4+jy_4;\ z^6=x_6+jy_6\ \ldots$$

transformed into:

$$Z=P(z)=\Sigma 1+x_1.\Sigma 2-y_1.\Sigma 4+j(\Sigma 3+x_1.\Sigma 4+y_1.\Sigma 2)$$

and defining:

Σ1, the algebraic sum $(a_0=a_2.x_2+a_4.x_4+a_6.x_6+\ldots)$
Σ2, the algebraic sum $(a_1+a_3.x_2+a_5.x_4=a_6.x_6+\ldots)$
Σ3, the algebraic sum $(a_2.y_2+a_4.y_4+a_6.y_6+\ldots)$
Σ4, the algebraic sum $(a_3.y_2+a_5.y_4+a_7.y_6+\ldots)$ derivative variables $x_2$ and $y_2$ being related to substitute variables $x_1$ and $y_1$ by relations:

$$x_2=x_1^2-y_1^2 \text{ and } y_2=2x_1.y_1$$

and derivative variables of higher orders being related to first derivative variables $x_2$ and $y_2$ by relations ($n$ being even).

24. System according to claim 21 comprising multiplying potentiometers coupled to the first shaft pair and receiving respectively potentials $x_1$ and $y_1$, and a multiplying potentiometer coupled to the shaft of said pair corresponding to variable $y_1$ and receiving potentials $x_1$; the output potentials of the sliders of said multiplying potentiometers being mixed in the input of the means controlling the shafts of the second pair; the mixtures taking place in accordance with a predetermined polynomial relation between variables $x_1$, $y_1$, and $x_2 . y_2$.

25. System according to claim 21 wherein for the production of the potentials $\pm x_4$ and $\pm y_4$, the shafts of the second pair support potentiometers receive potentials representing $x_2$ and $y_2$, and a third potentiometer is coupled to one of said shafts for receiving potentials representing the variable corresponding to the other shaft, there being further provided a number of transfer stages for receiving the output potentials from the sliders of said potentiometers so that one of said transfer stages will deliver output potentials proportional to the difference of potentials delivered by the sliders of the potentiometers which receive the potentials at terminals of the same denomination as their shaft; while the other of said transfer stages will deliver output potentials proportional to the potentials delivered by the slider of the potentiometer which receives at its terminals the potentials representing the variable corresponding to the shaft other than that coupled to its slider.

26. System according to claim 21 comprising a pair of shafts of primary control, means for producing rotations proportional to a trigonometrical function of two quantities represented by the rotations of said primary control shafts, and including means for controlling the shafts of the second pair under control of said primary control shafts and under control of the shafts of the first pair in accordance with the following trigonometrical formulae:

$$x_2 = \sin^2 a - \sin^2 b \text{ and } y_2 = \cos(a+b) - \cos(a-b)$$

$a$ and $b$ being the rotation values of the two primary control shafts.

27. System according to claim 21 comprising a cathode ray tube having an illumination control electrode and deflection assemblies and means for rectifying and adding the output potentials representing said real and imaginary portions, means under control of the added potentials for controlling the illumination of said tube so as to determine the roots of equation $P(z)=0$, and means controlling said electrode under control of the substitute variables $x_1$ and $y_1$.

28. System according to claim 21 comprising means for controlling the illumination control electrode under control of potentials of less than a predetermined value.

29. In a system for computing the real and imaginary portion of polynomial $P(z)$ of the $n$th degree, at least two first adjustment means adjustable to positions corresponding to a pair of substitute variables, other adjustment means controlled by said first adjustment means to produce a first pair of derivative variables, a number of means corresponding to the number of other pairs of derivative variables, each for computing another pair of derivative variables, each receiving potentials representing the preceding pair of derivative variables and controlled by said other adjustment means respectively, means for multiplying potentials representing all said pairs of derivative variables with potentials representing all even and odd numbered numerical coefficients of $P(z)$ respectively, to produce four series of product potentials of said derivative variables and said coefficients, further means for summing the two series of product potentials derived from said odd numbered numerical coefficients respectively, and means for multiplying each sum of said two series of product potentials with said substitute pair of variables to produce four product potentials of said sums and said substitute variables, and two final means for summing two of said last product potentials and one sum of one of the other two series product potentials derived from said even numbered numerical coefficients to produce output potentials representing respectively the real and imaginary portions of $P(z)$.

30. System according to claim 29 comprising a second pair of adjustment means and means under control of said first pair of adjustment means to control said second pair of adjustment means and to produce potentials representing respectively said first pair of derivative variables.

31. System according to claim 29 wherein said controlled means include sources of potentials adjusted by said first pair of adjustment means to produce said pair of substitute variables and sources of potentials adjusted by said second pair of adjustment means under control of said substitute variables to produce said first pair of derivative variables.

32. System according to claim 29 wherein said computing means include a number of groups of sources of potentials corresponding to a number of other pairs of derivative variables; each group including two sources of potentials representing the preceding pair of derivative variables and controlled by said second pair of adjustment means to produce potentials representing a succeeding pair of derivative variables.

33. System according to claim 29 wherein said multiplying means include four multiplying groups wherein two groups include a number of sources of potentials representing a number of pairs of derivative variables and adjusted to produce product potentials of derivative variables and the odd numbered coefficients of $P(z)$.

34. System according to claim 29 wherein said further summing means and multiplying means include two means for adding product potentials derived respectively from a number of pairs of derivative variables and the odd numbered coefficients of $P(z)$ and two pairs of sources of potentials representing the sums of the last two product potentials and controlled by said first pair of adjustment means to produce four product potentials of sums of said last two products multiplied by pairs of substitute variables; and wherein said final summing means include two means for adding respectively two product potentials derived from said last pairs of sources and the product potentials derived from the corresponding number of single derivative variables and the even numbered coefficients of $P(z)$ to produce two output potentials representing respectively the real and imaginary portions of $P(z)$.

35. In a system for computing the real and imaginary portions of a polynomial $P(z)$ of $n$th degree, at least two adjustment means adjustable to positions corresponding to a pair of substitute variables representing the real and imaginary portions of $z$, potential dividing means including sources of reference potentials received thereon and controlled by said adjustment means to reproduce potentials representing respectively said pair of substitute variables, other potential dividing means receiving said substitute variables and controlled by said adjustment means to produce a first pair of derivative variables derived from said substitute variables, a number of groups of further potential dividing means corresponding to a number of other pairs of derivative variables each particular pair of said other pairs of derivative variables being derived from derivative variables preceding said particular pair; each group of said further potential dividing means including two potential dividing means receiving potentials representing a preceding pair of derivative variables and controlled by potentials representing said first pair of derivative variables to produce potentials representing a succeeding pair of derivative variables; a number of potential dividing means receiving all said pairs of derivative variables and controlled by all even numbered numerical coefficients of P(z) to produce two series of product potentials of said derivative variables with said even numerical coefficients of P(z) a number of further potential dividing means receiving all said pairs of derivative variables and controlled by the odd numbered numerical coefficients of P(z) to produce further series of product potentials of said derivative variables of said odd numbered numerical coefficients of P(z), means for summing said further two series of product potentials respectively, pairs of potential dividing means receiving the sums of said further two series of product potentials and controlled by potentials representing said substitute variables to produce four product potentials of sums of said further two series of products multiplied by pairs of substitute variables; and final means for summing two of the last product potentials and one sum of product potentials derived from one of said first two series of product potentials to produce output potentials representing respectively the real and imaginary portions of P(z).

36. System according to claim 35 comprising two pairs of shafts and means for driving the first shaft pair to angular positions corresponding to the values of substitute variables $x_1$ and $y_1$, means under control of the first shaft pair for driving the second shaft pair to angular positions corresponding to the value of variables $x_2$ and $y_2$ including several potential dividing means supplied by reference potential difference and a potential difference representing variables $x_1$ and $y_1$ respectively, and having dividers coupled to said first shaft pair to control said second shaft pair and to deliver potential differences representing the values of products of angular positions $x_2$, $y_2$ respectively.

37. System according to claim 35 comprising polarity inversion means connected to at least some points of said potentials and to at least some of said summing means.

38. System according to claim 35, comprising a number of summing amplifiers and a number of assemblies of potential dividing means having dividers coupled to said second shaft pair receiving a reference potential difference and a potential difference representing derivative variables $x_2$ and $y_2$ respectively; and assemblies of four potential dividing means corresponding to the number of other pairs of values of derivative variables $x_n$ and $y_n$, said four potential dividing means having two dividers coupled to the shaft corresponding to $x_2$ and two other dividers coupled to the shaft corresponding to $y_2$, two potential dividing means of each shaft receiving potential differences representative of derivative variables $x_{n-2}$ and $y_{n-2}$, and the two dividers of each shaft representing products of variables $x_2$, $y_2$ and $x_{n-2}$, $y_{n-2}$, being coupled to different inputs of said further amplifiers the outputs of which form potential differences representing variables $x_n$ and $y_n$.

39. System according to claim 35 wherein said multiplying means include four multiplying potential dividing assemblies having dividers indicating the values of the coefficients of four algebraic sums Σ1 to Σ4; said potential dividing means receiving respectively the potentials to be multiplied by said numerical coefficients; the multiplying potential dividing means including coefficients $a_0$ and $a_1$ receiving a reference potential difference; two further summing amplifiers having inputs receiving respectively the divider potentials of those multiplying potential dividing means indicating the coefficients entering in the formation of algebraic sums Σ2 and Σ4; four further potential dividing means having dividers coupled in pairs to the first pair of shafts corresponding to variables $x_1$ and $y_1$, said two further summing amplifiers having outputs supplying each two of said latter potential dividing means, thereby to deliver at the dividers of said four further potential dividing means the four potentials $x_1$, Σ2—Σ1Σ4, $x_1$Σ4 and $y_1$Σ2—Σ1, Σ2, Σ3, Σ4, being defined as follows:

Σ1, the algebraic sum $(a_0+a_2.x_2+a_4.x_4+a_6.x_6+ \ldots)$

Σ2, the algebraic sum $(a_1+a_3.x_2+a_5.x_4=a_6.x_6+ \ldots)$

Σ3, the algebraic sum $(a_2.y_2+a_4.y_4+a_6.y_6+ \ldots)$

Σ4, the algebraic sum $(a_3.y_2+a_5.y_4+a_7.y_6+ \ldots)$

40. System according to claim 35 wherein said final summing means include two summing amplifiers having inputs receiving respectively the potential difference of those further potential dividers indicating the numerical coefficients entering in the formation of the algebraic sum Σ1; the potential difference of those further potential dividers coupled to the shafts indicating values $x_1$ and $y_1$ and supplying the potential difference representing sums Σ2 and Σ4; the potential difference of those further potential dividers indicating the numerical coefficients entering in the formation of algebraic Σ2; and the potentials of these further potential dividers coupled to the shafts indicating values $x_1$ and $y_1$ and supplying the potential difference representing sums Σ4 and Σ2—Σ1, Σ2, Σ3, Σ4, being defined as follows:

Σ1, the algebraic sum $(a_0+a_2.x_2+a_4.x_4+a_6.x_6+ \ldots)$

Σ2, the algebraic sum $(a_1+a_3.x_2+a_5.x_4+a_7.x_6+ \ldots)$

Σ3, the algebraic sum $(a_2.y_2+a_4.y_4+a_6.y_6+ \ldots)$

Σ4, the algebraic sum $(a_3.y_2+a_5.y_4+a_7.y_6+ \ldots)$ said final summing amplifiers having outputs delivering respectively potential differences representing the values of the real portion R(z) and imaginary portion J(z) of the equation having said coefficients.

References Cited in the file of this patent

UNITED STATES PATENTS

| | | |
|---|---|---|
| 2,444,549 | Anderson | July 6, 1948 |
| 2,454,549 | Brown et al. | Nov. 25, 1948 |
| 2,538,253 | Lakatos et al. | Jan. 16, 1951 |
| 2,558,430 | Goldberg | June 26, 1951 |
| 2,613,032 | Serell et al. | Oct. 7, 1952 |